UNITED STATES PATENT OFFICE.

JOSEPH JORDAN, OF BRIDGEPORT, PENNSYLVANIA.

COMPOSITION FOR SIZING PAPER.

SPECIFICATION forming part of Letters Patent No. 336,569, dated February 23, 1886.

Application filed November 30, 1885. Serial No. 184,340. (No specimens.)

*To all whom it may concern:*

Be it known that I, JOSEPH JORDAN, a citizen of the United States, and a resident of Bridgeport, Montgomery county, Pennsylvania, have invented a new and useful Improvement in Compositions for Sizing Paper, of which the following is a full, clear, and exact description.

The nature of my invention will fully appear from the following description and claims.

Its object is to produce a sizing or coating for paper, which will make it non-adhesive and impervious to moisture.

I employ a combination of wax, oil, and silicate of soda or dissolved glass. I have found that the proportions of two-tenths of oil, two-tenths of silicate of soda, and six-tenths of wax, will produce excellent results for use as a sizing for coating paper upon either or both surfaces.

I melt the wax in a suitable vessel under the influence of heat, the silicate of soda and oil having previously been united or mixed together, and then poured into the melted wax. The mass is then stirred until the ingredients are thoroughly mixed or incorporated one with another.

It is well known that in silicate of soda the soda retains sufficient of its inherent properties as an alkali to act to a certain extent as an alkali upon substances with which it is brought into contact. In my compound, therefore, the soda in the silicate operates to form an intimate union between the oil and the melted wax, whereby the oil, wax, and silicate of soda become not only mechanically but chemically united. The action of the soda upon the oil and wax is such as to adapt them when mixed together to be intimately blended, the silica, oil, and wax thereby becoming thoroughly compounded.

In practice I use cotton-seed or other vegetable oil, bay-berry or other vegetable wax, and silicate of soda, otherwise denominated "dissolved glass." I can, however, use mineral or fish oils or wax.

In case I use any ingredients which have an unpleasant odor I mix with my compound in its fluid condition any suitable deodorizer well known in the arts. To give my desired scent, I employ any of the essential oils with my compound.

My compound while in a melted or liquid state may be applied to either or both surfaces of paper by any of the means or mechanisms well known to those skilled in the art of coating paper with wax and other sizing.

My compound, when applied, renders the paper not only non-adhesive to the substance about which it is wrapped; but it is also impervious to and indestructible by moisture. It is also moth-proof, as these insects will not attack it.

Another advantage to paper treated by my compound is that the paper is thereby rendered translucent or semi-transparent, whereby it may be used for tracing drawings, and its strength and flexibility are increased.

When I design my paper to be used for tracing purposes, I apply my compound to it while the latter is in a very liquid or thin condition, whereby the compound will be thoroughly absorbed by the paper, leaving little of the compound upon the surface thereof.

The action of the oily ingredient of my compound upon the paper is to thoroughly permeate the latter and render it flexible.

A crude means of applying my compound in its melted state to the paper is by the use of a broad brush. It may be applied to the paper by the well-known machines employed for applying surface-sizing to writing-paper. I employ either paraffine, beeswax, or spermaceti, or other wax, which may be melted by heat.

By increasing the proportion of oil or silicate in making my compound, or of oil and silicate, I increase the non-adhesive quality of my paper and economize in the cost of the compound. These ingredients are cheaper than the wax.

While I have mentioned certain proportions above I do not limit myself to them, as approximately good results can be obtained even though these proportions are much varied. The various purposes to which the paper is to be applied will determine the proportions of material to be used in the compound.

The silicious part of the silicate of soda, which forms a component part of my sizing, is an important factor in making the sizing non-adhesive and impervious to moisture.

As a preliminary step to coating my paper with the above-described sizing, I saturate the same with oil, either by spraying the same upon the paper or passing the paper around a roller, and then through a bath of oil, after which the paper is passed between two compressing-rolls, to express superfluous oil from it. This oil within the body of the paper prevents the absorption of an unnecessary quantity of the waxy coating. The wax is more expensive than the oil.

What I claim as new is—

1. As a sizing for paper, the compound consisting of the combination of wax, oil, and silicate of soda, substantially as described.

2. As a sizing for paper, a compound consisting of the combination of vegetable wax, oil, and silicate of soda, substantially as described.

3. As a sizing for paper, the compound consisting of the combination of wax, vegetable oil, and silicate of soda, substantially as described.

4. As a sizing for paper, the compound consisting of the combination of vegetable wax, vegetable oil, and silicate of soda, substantially as described.

5. As a sizing for paper, the compound consisting of the combination of wax, oil, and silicate of soda spread upon the surface of paper, substantially as described.

6. As a sizing for paper, the compound consisting of the combination of wax, oil, and silicate of soda, the same having a deodorizing agent incorporated therewith to remove any disagreeable smell, substantially as described.

7. As a sizing for paper, the compound consisting of the combination of wax, oil, and silicate of soda, the same having a perfuming agent incorporated therewith, substantially as described.

8. In sizing paper, saturating it with oil, then treating it with a compound consisting of the combination of wax, oil, and silicate of soda, substantially as described.

JOSEPH JORDAN.

Witnesses:
 WM. H. CARSON,
 GEORGE E. BUCKLEY.